United States Patent [19]

Jones

[11] 4,086,319
[45] Apr. 25, 1978

[54] RECOVERY OF CHROMIUM FROM TANNERY WASTE

[76] Inventor: Bradford H. Jones, 85 Portsmouth Ave., Stratham, N.H. 03885

[21] Appl. No.: 740,016

[22] Filed: Nov. 8, 1976

Related U.S. Application Data

[63] Continuation-in-part of Ser. No. 694,244, Jun. 9, 1976, abandoned.

[51] Int. Cl.$^2$ .................... C01G 37/02; C01G 37/14
[52] U.S. Cl. ................................ 423/53; 423/210.5; 423/597; 423/607; 8/94.27
[58] Field of Search ............... 423/53, 55, 210.5, 607, 423/DIG. 12, 597; 8/94.27; 75/108, 121; 110/7 B, 8 A

[56] References Cited

U.S. PATENT DOCUMENTS

| 3,647,358 | 3/1972 | Greenberg | 423/210.5 |
| 3,950,131 | 4/1976 | Young | 423/55 |

FOREIGN PATENT DOCUMENTS

| 424,671 | 8/1947 | Italy | 8/94.27 |

OTHER PUBLICATIONS

"Standard Method of Test for Total Ash in Leather" A.S.T.M. D2617–D2669 (1969).
"Standard Method of Test for Chromic Oxide in Leather" A.S.T.M. D2807–D2872 (1972).
Hauck, "Report on Methods of Chromium Recovery & Reuse from Spent Chrome Tan Liquor," J. Am. Leather Chemists Assoc., vol. 67, No. 10 (1972), pp. 422–430.
"Process Design Manual for Sludge Treatment & Disposal" U.S.E.P.A. 625/1-74-006, Oct. 1974, pp. iii, 8-6, 8-17, 8-24, 8-35.

*Primary Examiner*—O. R. Vertiz
*Assistant Examiner*—Brian E. Hearn
*Attorney, Agent, or Firm*—Thompson, Birch, Gauthier & Samuels

[57] ABSTRACT

A process is disclosed for incinerating tannery waste solids containing organic material and chromium which comprises burning at least one ton per day of said waste in the combustion zone of an industrial furnace at a low temperature, preferably between about 800° F. and 1200° F., to convert at least a portion of the organic material to gases and the chromium to ash, removing the gases from the combustion zone and subjecting them to further oxidation, and removing the ash from the furnace. The waste solids include sludge separated from liquid waste, leather scrap, or preferably both. By controlling temperature, waste composition, or both, the chromium in the ash can be obtained in either trivalent or hexavalent form. The hexavalent chromium can be extracted with solvent for reuse in the tanning process. Trivalent chromium, with or without carbon, can be recovered as chromic oxide in an improved stable form for landfill, storage or shipment to a reprocessing center.

19 Claims, 3 Drawing Figures

RECOVERY OF CHROMIUM FROM TANNERY WASTE

CROSS-REFERENCE TO RELATED APPLICATION

This application is a continuation-in-part application of United States Application Ser. No. 694,244 filed June 9, 1976, now abandoned, both applications being filed by the same inventor.

BACKGROUND OF THE INVENTION

This application relates to a process for treating wastes from tanneries which convert hides to leather.

In the tanning of leather, the hides are first prepared by mechanical and chemical treatments to remove preservatives such as salt, hair, adhering flesh, and to remoisturize the hides. Such operations are generally known as "Beamhouse" operations and produce substantial quantities of waste water containing both dissolved and suspended organic matter from the hides and chemicals used in preparing the hides.

The thus prepared hides are then subjected to treatment with various tanning compounds to preserve the structure of the hide and prevent putrifaction. Trivalent chromium, typically hydrated basic chromium sulfate, is widely used. The trivalent chromium is often prepared at the tannery by reducing hexavalent dichromate with sulfuric acid and sugar. The cost of the chromium employed in tanning is a significant cost of operation. Substantial quantities are lost and carried away with the waste water resulting from the tanning and large quantities are also carried away with leather waste produced as scrap from trimming, shaving, buffing and the like. Such losses can amount to as much as two-thirds of the chromium employed in the process. Such loss is also an environmental hazard since all the ions of chromium are toxic, particularly the hexavalent ions. A typical tannery processing from 2000 to 3000 hides per day will lose about 2500 pounds of chromium (as $Cr_2O_3$) per day, about 50% to 60% in the waste water and about 40% to 50% in the leather scrap.

The solid leather scrap containing chromium has heretofore been sold for conversion to fertilizer at prices approximating the cost of transportation for that purpose. The liquid wastes from the Beamhouse and tanning operations have generally been either passed directly to surface waters or combined in a separation tank where the suspended matter, usually aided by addition of precipitating or flotation agents, forms a wet sludge which is removed and disposed in landfill. Recent efforts to improve the handling of these wastes have concentrated on secondary and tertiary treatments of the liquid waste from the separation tanks and from dewatering of the wet sludge to reduce its volume and to retard the leaching of toxic materials such as chromium therefrom by weathering and anaerobic digestion.

For analysis, small samples of leather have been incinerated in closed laboratory furnaces at 600° C., chromium extracted from the resulting ash with hazardous oxidizing acids, and the amount of chromium determined by titration. However, full scale disposal of sludge or leather scrap by incineration has not been considered practical because of cost, difficulty in burning organic matter including resulting odors, and because the operating temperatures of conventional incinerators tend to produce harmful quantities of toxic chromium which are emitted with the furnace exhaust gases. Typical conventional incinerators operate at temperatures of from 1400° F. to 1700° F. or higher.

SUMMARY OF THE INVENTION

Objects of the present invention include the provision of an improved process for handling tannery wastes which minimizes environmental hazards, is relatively economic to operate, utilizes the fuel value of the organic material in such wastes, and which recovers all or a substantial portion of the waste chromium for reuse, or renders it to a stable form with a 90–95% reduction in volume.

While the tannery waste solids treated according to the present invention can comprise sludge alone, it preferably includes leather scrap, heretofore discarded but which contains substantial chromium and fuel value, either alone or preferably mixed with sludge. The sludge or mixture of sludge and scrap is preferably dewatered, for example to 20% to 45% solids by weight. Mechanical processes for dewatering are preferred, for example, compacting or centrifuging.

The present process comprises burning substantial quantities of solid tannery waste, at least one ton per day, in the combustion zone of an industrial furnace at a relatively low controlled temperature, below about 1200° F., preferably between about 800° F. to 1200° F., and most preferably about 900° F. to 1000° F., to convert the organic material to gases, or a mixture of carbon and gases, and the chromium to ash. Combustion at relatively low temperature substantially avoids harmful evolution of hexavalent chromium in the gaseous effluent, but results typically in incomplete combustion of the organic material. The gases are therefore removed from the combustion zone and subjected to additional oxidation to deodorize them prior to discharge to the atmosphere. Additional gas treatments may also be employed as required, for example treatments to remove the oxides of sulfur.

Chromium employed in the tanning process is usually in the trivalent state and may be recovered in that form in the combustion ash by employing temperatures below about 900° F., or by avoiding the presence of basic carbonate or other oxidizing agents, or both. The chromic oxide so formed is stable, substantially insoluble, and substantially free of organic material. It can be shipped to processors for conversion to other commercial compounds and is in a safer and more compact form for storage or for disposal in landfill. For shipment to processors or for landfill in this form, the original organic material present need not be fully oxidized and can be carbonized, for example at lower temperatures such as 600° F. to 650° F., or at higher temperatures with insufficient oxygen to complete combustion. Such carbon can provide fuel value to a subsequent processor and, since it is inert, can stablize the ash against weathering.

Hexavalent chromium is generally preferable, however, since it is soluble and can be recovered for reuse by a tannery, suitably equiped, and has a higher economic value for further processing. It is known that trivalent chromium will fuse to hexavalent chromium or dichromate in the presence of basic carbonate according to the equation:

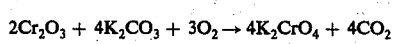

$2Cr_2O_3 + 4K_2CO_3 + 3O_2 \rightarrow 4K_2CrO_4 + 4CO_2$

Other metal cations can be substituted for the potassium above, for example sodium, calcium, etc., preferably alkali or alkaline earth metals due to their solubility and thermal stability. Such carbonate compounds and lime can be added to the tannery wastes charged to the furnace as needed. However, tannery sludge often contains sufficient carbonate at basic pH and further additional is not needed. In incinerating acidic leather scrap or waste mixtures, care should be exercised to assure an adequate carbonate content and basic pH to avoid carbonate decomposition. pH control and carbonate additions are needed to produce a chromate ore where leather scrap alone is burned. While lower temperatures can be employed if sufficient oxidation time is provided, temperatures of about 900° F. to 1000° F. are preferred for practical operation.

Thus the furnace combustion process itself can be utilized to fuse trivalent chromium to the more valuable hexavalent chromium and the oxidizing carbonate can be obtained from the tannery sludge without additional cost. The low temperature of combustion is further advantageous in substantially avoiding thermal decomposition of the carbonate, or other oxidizing agent, and because it reduces emission of highly toxic hexavalent chromium in the stack gases.

The hexavalent chromium in the ash is soluble in water and acids and can be recovered by leaching with such solvents. Acids recover a higher percentage of the chromium in the ash and are preferred, stronger acids generally giving higher concentrations. Such solutions can be reused as recovered to prepare tanning liquid or they can be further treated by filtration, washing, concentration or the like as preferred.

The economic value of the chromium recovered is substantial and should more than offset the cost of operating the recovery facility, including amortization of equipment. By utilizing the scrap leather, and by concentrating the sludge, the heat required to maintain the furnace at its operating temperature can be provided largely or substantially entirely from the waste combustion itself, and substantial net heat recovery is possible. Known types of commercial furnaces, such as those which pass the combustion gases in contact with a molten salt or which subject the gases to further combustion in an after-burner or separate molten salt scrubber can be employed to complete the oxidation of the gases produced by the initial low temperature incineration. A molten salt furnace is preferred.

While leather scrap, alone or admixed with sludge after dewatering, can be burned as herein disclosed, the leather scrap advantageously can be ground and used to aid in handling the liquid wastes. Ground leather scrap mixed with the sludge prior to dewatering aids in water removal, while its addition to the settling tanks aids in sludge separation and settling in the tanks. Furthermore, ground leather scrap can be used as a sorptive filter body for the liquid separated from the sludge to separate additional suspended matter and reduce or eliminate the need for further liquid secondary or tertiary treatment. A filter body of ground leather scrap is normally sufficient. However, the scrap can be carbonized to form an activated carbon filter, if desired. The leather scrap should be ground into particles for use as a filter body or for addition to the settling tanks, but should not be so finely divided as to hinder proper settling in the settling tanks or proper liquid flow through the filter body. The size of coarse sand, about 0.6 to 1.2 millimeters in diameter, is suitable.

DESCRIPTION OF PREFERRED EMBODIMENTS

Figure 1:
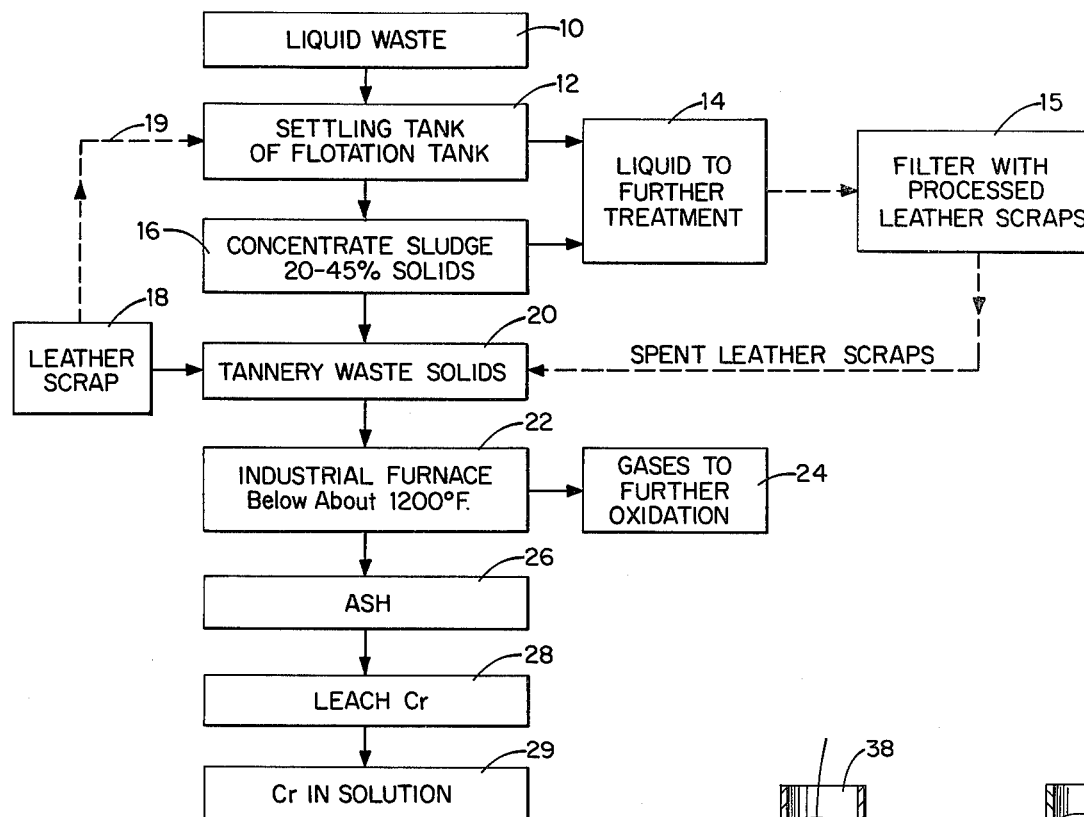
FIG. 1 is a flow chart of the preferred embodiment of the present invention employing tannery waste solids which are a mixture of concentrated sludge and leather scrap.

Referring to the flow chart illustrated in FIG. 1, liquid waste indicated at 10 is passed to either a settling or flotation tank indicated at 12. The nature and quantity of such wastes and recommended designs for settling tanks are described, for example, in a publication in September of 1969, entitled "Activated Sludge Treatment of Chrome Tannery Wastes", by the A.C. Laurence Leather Company of South Paris, Maine, prepared under grant No. WPRD 133-01-68, program No. 12120 of the Federal Water Pollution Control Administration, Department of the Interior, and available for sale from the Superintendent of Documents, U.S. Government Printing Office. The liquid waste 10 can comprise the liquid from the chrome tanning operations alone, but preferably is a mixture of such tanning wastewater with the waste-water from the Beamhouse operations which produces a chromium hydroxide precipitate. While only the tanning water contains chromium, both liquid effluents must be treated and are conveniently treated in a single system in which the acidic tanning wastes and the alkaline Beamhouse wastes are at least partially self-neutralizing. The settling of suspended material and the precipitation of some dissolved material is enhanced in the separation tank by addition of settling and precipitating agents, such as the ground leather scraps indicated by the broken line 19 or by polymers which are well known for this purpose. Separation using flotation principles is also known.

Following separation, the separated sludge is removed. As illustrated at 14, the supernatant liquid is withdrawn and preferably given additional treatment(s) to purify it before discharge. Secondary and tertiary treatments are well known and recommended treatments are described in the above-identified publication. Alternatively, the need for such treatments can be reduced or eliminated by passing the liquid through a filter body of processed leather scrap, either ground leather scrap or carbonized leather scrap, as indicated at 15.

The sludge initially separated from the settling tank 12 normally contains from 85% to 95% water and is too wet to support combustion. While it can be dried in the furnace, this requires addition of fuel and it is preferred to concentrate it prior to introduction to the furnace. Concentration can be performed by evaporation, but the wet sludge is preferably mechanically dewatered by compaction, centrifuging, or the like. Compacting is preferred by use of a filter press or belt press. Such concentration of sludge or mixture of sludge and ground leather scraps can produce material which will support combustion, preferably 20% to 45% solids by weight, and more preferably 30% to 45% solids.

The concentrated sludge, indicated at 16, can be separately incinerated or the leather scrap 18 separately incinerated, the leather scrap having typically from 40% to 50% of the available chromium for recovery and high fuel value. However the acidic leather scrap is preferably mixed with the alkaline sludge in one or more of the procedures previously described.

The tannery waste solids 20 are fed into an industrial furnace indicated at 22. The furnace is operated at relatively low temperature, below about 1200° F., preferably between about 800° F. and 1200° F., and most preferably about 1000° F. The incombustible material including the trivalent chromium is reduced to an ash in the furnace while the organic material in the waste is converted to gases or a mixture of gases and carbon as previously described. At the low temperatures employed, these gases are not completely oxidized and are removed from the combustion zone and subjected to further treatment to complete oxidation. They may also be subjected to additional treatments to remove other harmful ingredients. By thus employing low temperature combustion to produce an ash, and by subjecting the organic material and resulting gases to at least two oxidation steps, the evolution of chromium in the gases is minimized and the organic material can be burned to products, principally $CO_2$ and $H_2O$, which can be exhausted to the atmosphere. The secondary oxidation of the furnace gases is indicated at 24.

The ash 26 containing the chromium in trivalent or hexavalent form as previously described is removed from the furnace. The hexavalent chromium can be leached therefrom at 28 to produce a chromium solution 29 by a leaching solvent therefor. Water or aqueous acids such as nitric acid ($NHO_3$) or sulfuric acid ($H_2SO_4$) or mixtures thereof can be employed and the chromium recovered either in dilute or concentrated form as preferred for the operations of the particular tannery employing the process. If the tannery operations permit, the chormium in solution may be used in the form obtained as a source of bichromate. However, if required, the chromium may be further treated in any suitable manner, for example by concentration with heat or purification by filtration, precipitation, washing, redissolving or the like. Filtering is normally desirable. Heat from the furnace may also be recovered.

Figure 2:
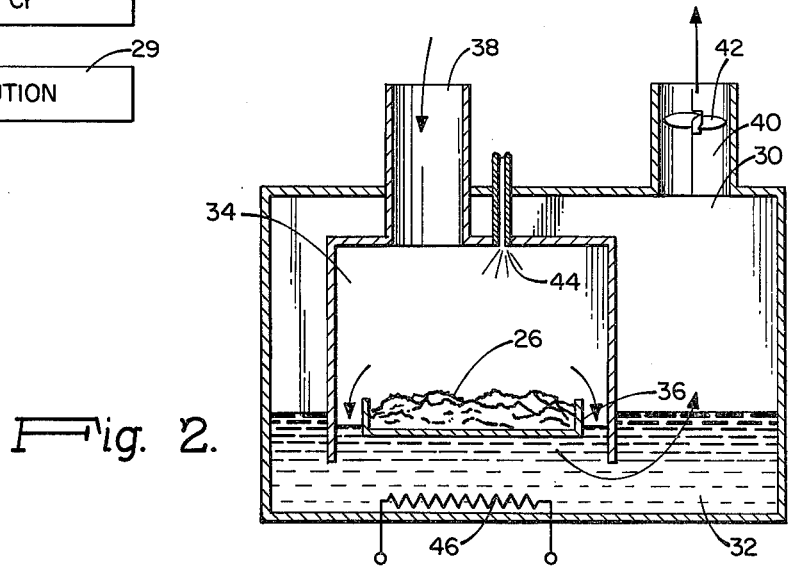
FIG. 2 is a schematic vertical section of a molten salt furnace suitable for use in the practice of the present invention.

One form of industrial furnace for low temperature combustion of tannery waste is illustrated in FIG. 2. The furnace comprises an outer chamber 30 containing the molten salt 32 in the bottom thereof, and an inner chamber 34 having an open bottom defined by edges which are preferably immersed below the surface of the molten salt 32. A metal hearth 36 is located within the inner chamber 34 and floats on or is in contact with the surface of the molten salt 32. The hearth 36 can comprise a screen or a solid body having peripheral openings, such as slots or holes, permitting the passage of gases therethrough and collects the ash or carbonized residue which is produced in the furnace.

Inner chamber 34 has an air inlet 38 and outer chamber 30 has an air outlet 40 in which an exhaust fan 42 is located. A fuel burner 44 is provided within chamber 34 for supplying heat to the furnace. Burner 44 can be operated throughout the process, if required, but is normally employed to initiate combustion. After initiation, temperature is maintained largely or entirely by the heat of combustion or the waste 20. In order to control temperature, the rate of air flow into chamber 34 can be controlled, or the furnace can be supplied with a cooling jacket or heat exchanger (not shown).

In operation, the furnace illustrated in FIG. 2 is operated by activating the fan 42 which creates a partial vacuum within the chamber 30 which raises somewhat the level of molten salt between the inner and outer chambers. Air is drawn through the inlet 38 into the inner chamber 34, waste solids 20 are introduced into the air stream and incinerated in the initial combustion zone defined by the chamber 34 above the hearth 36, with or without heat supplied by burner 44, and the resulting ash or residue 26 collected on hearth 36. The resulting combustion gases pass through the openings in hearth 36, bubble thorugh the molten salt 32, and thence pass through the gas outlet 40. Since the furnace is operated at relatively low temperature, the gaseous products of combustion from the organic material in waste 20 are not completely oxidized in the combustion zone of chamber 34 and are subjected to additional hot, catalytic oxidation in passing through and/or in contact with the molten salt 32. The molten salt will normally complete oxidation of the gases but additional oxidation or other treatments may be added if desired. Alkaline salts, such as lime or alkali metal hydroxides, carbonates and the like, can be added to the molten salt 32 to react with and remove acid gases such as the oxides of sulfur.

Molten salt furnaces are known and are described for example in U.S. Pat. Nos. 3,766,087; 3,642,583; and 3,647,358 and the disclosures thereof are incorporated herein by reference. Any suitable salt which is molten at the operating temperature of the furnace can be employed, for example $Na_2SO_4$ or any of the mixtures disclosed in the above cited patents. The molten salt will normally be at the same temperature as the combustion zone of the furnace but can if desired be raised or lowered by the use of auxiliary heating or cooling means (not shown). For initial start-up, the salt is melted by external heating means such as the resistance heater 46 or by the burner 44.

Figure 3:
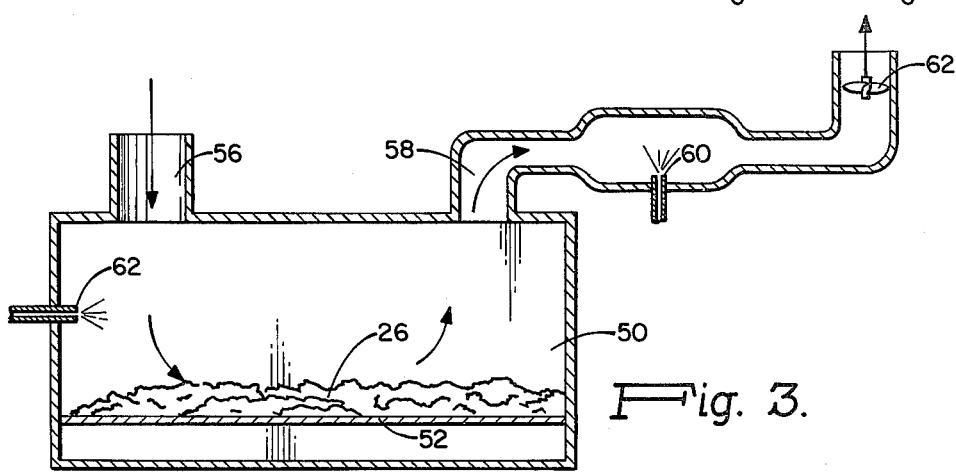
FIG. 3 is a schematic vertical section of a second type of industrial furnace usable with the present invention and which contains an after-burner for the further treatment of the exhaust gases from the furnace.

An alternative form of known furnaces is schematically illustrated in FIG. 3. This furnace comprises a combustion chamber 50 having a grating 52 onto which ash or carbonized residue is collected. Air is drawn into the furnace combustion chamber 50 through inlet 56, tannery waste solids 20 introduced and incinerated, and the resulting gases passed through an after-burner 60 by means of exhaust fan 62. If desired, a separate molten salt scrubber operating at lower temperature may be substituted for after-burner 60. The combustion chamber 50 has a burner 62 to initiate combustion, and if necessary, maintain combustion temperature, chamber 50 above grating 52 defining the initial combustion zone. This furnace is also operated at low temperature as herein defined and the incompletely oxidized exhaust gases are subject to an additional oxidation treatment in the after-burner 60 which is preferably operated at a higher temperature, for example a temperature above about 1400° F., and preferably 1700° F. or higher. For combustion at the higher temperatures, fire resistant linings are normally required. However, such linings are not required at about 1000° F. and the low temperature of initial combustion thus provides the further advantage of a simplified and less costly construction for the main combustion chamber 50 of FIG. 3, or for chambers 30 and 34 of FIG. 2.

In one test, the furnace ash containing fused hexavalent chromium was leached with 0.1 N aqueous nitric acid at room temperature. The resulting solution was filtered and a 1% by weight solution of hexavalent dichromate was obtained with a yield of over 80% of the chromium originally present in the tannery waste solids. With suitable concentration by evaporation, e.g. to 10% by weight, the dichromate solution obtained is reusable for tanning by reduction with sulfuric acid and sugar. Where the volume is sufficient to leach substantially all the chromium from the ash, or the acid can be recirculated, stronger nitric acid, e.g. 1.0 N at elevated temperature is preferred to increase yield and to minimize concentration requirements. Other suitable leaching liquids which dissolve chromate, with or without reduction, can be employed. Subsequent tests have been successful in removing substantially all of the chromium from the ash.

While the chromium recovered in solution as described herein is readily usable in additional tanning operations, the chromium can be recovered for other uses if desired. For example, the chromium in solution may be reduced to metal by electrolysis or chemical reaction and used for metallurgical application.

The operating temperatures for the combustion zone of the furnaces herein described refer to the average equilibrium-temperature in the combustion chamber above the grating or hearth. For the preferred molten salt furnaces, this temperature will be the same as the temperature of the molten salt where the temperature of the salt bath is maintained by the heat of the combustion chamber. For other furnaces such as the combustion chamber 50, or a molten salt bath subject to additional forced heating or cooling, the temperature is determined by arithmetically averaging a number of readings taken at equal spacings throughout the chamber, sufficient readings being taken to obtain an average value that does not materially change by averaging a greater number of readings. Thus, for example, readings may be taken at the approximate center of each cubic foot of enclosed space within the chamber, the readings added, and the resulting sum divided by the number of readings. Readings in contact with open flame or with fresh incoming air should be avoided. For furnaces having relatively uniform temperatures, fewer readings are needed.

In the absence of an adequate and economical process for burning tannery waste and for recovering chromium in the past, large amounts of waste have been collected in dumps and storage areas. Such stored waste can also be treated by the present process to provide a source of chromic or chromate ore which is becoming scarce. Such treatment also reduces the potential for further environmental harm.

It should be understood that the foregoing description is for the purpose of illustration and that the invention includes all equivalents and modifications within the scope of the appended claims.

What is claimed is:

1. The method of processing tannery waste solids containing trivalent chromium and organic material and recovering chromium therefrom, said method comprising:
    (a) burning at least one ton per day of said waste in the combustion zone of an industrial furnace at a temperature below about 1200° F. in the presence of sufficient alkali to oxidize the majority of said chromium to hexavalent chromium in the furnace ash and to convert at least a portion of said organic material to gases;
    (b) removing said gases from the combustion zone and subjecting them to further oxidation; and,
    (c) removing said ash from the furnace and recovering said hexavalent chromium therefrom.

2. The method according to claim 1 wherein said temperature is between about 800° F. and 1200° F., and said hexavalent chromium is recovered by leaching with a solvent therefor which is inert to trivalent chromic oxide.

3. The method according to claim 2 wherein said temperature is between about 900° F. and about 1000° F., and wherein more than about 80% of the trivalent chromium in said waste is oxidized to hexavalent chromium in said furnace and recovered.

4. The method according to claim 2 wherein said waste solids comprise chrome-tanned leather scrap.

5. The method according to claim 4 wherein a portion of said leather scrap comprises a spend filter body of ground scrap through which tannery waste liquid has been filtered.

6. The method according to claim 2 wherein said waste solids comprise a chromium containing alkaline sludge separated from liquid tannery waste.

7. The method according to claim 2 wherein said solvent is an aqueous acid.

8. The method according to claim 7 wherein said solvent is nitric or sulfuric acid.

9. The method according to claim 2 wherein at least a portion of said alkali is carbonate.

10. The method according to claim 9 wherein said tannery waste solids comprise a mixture of carbonate-containing alkaline sludge and chrome-tanned leather scrap.

11. The method according to claim 10 wherein said mixture contains a proportion of said alkaline sludge sufficient to supply substantially all of said alkali.

12. The method according to claim 1 comprising the further preliminary steps of separating chromium containing alkaline sludge from tannery liquid waste and partially dewatering said sludge, said tannery waste solids comprising a wet mixture of said sludge and leather scrap having more than about 20% by weight solids.

13. The method according to claim 12 wherein said leather scrap is added to said sludge prior to dewatering.

14. The method according to claim 1 wherein said gases are subjected to further heat in an after-burner at a temperature above about 1400° F.

15. The method according to claim 1 wherein said furnace is a molten salt furnace and said gases are subjected to further oxidation by contact with the hot molten salt, said alkali being admixed with the waste externally of the molten salt.

16. The method of disposing of both liquid and solid tannery wastes containing trivalent chromium and organic material to minimize environmental pollution and recover chromium therefrom, said method comprising:
    (a) providing in a separation tank a mixture of alkaline beamhouse waste liquids and spent chrome tanning solution;
    (b) separating from said liquids an alkaline sludge containing said trivalent chromium; (c) partially dewatering said sludge;
    (d) mixing said sludge with scrap chrome-tanned leather, the mixture having at least about 20% by weight solids;

(e) burning at least one ton per day of said mixed solids in the combustion zone of an industrial furnace at a temperature between about 800° F. and about 1200° F. in the presence of sufficient alkali to oxidize the majority of said trivalent chromium to hexavalent chromium in the ash and at least a portion of said organic materials to gases;

(f) removing said gases from the combustion zone and subjecting them to further oxidation; and (g) recovering said hexavalent chromium from the ash by leaching with a solvent therefor which is inert to trivalent chromic oxide.

17. The method according to claim 16 comprising the further steps of filtering liquid from said settling tank through a sorptive filter body of ground leather scrap, and burning the spent leather scrap from said filter body in said furnace.

18. The method according to claim 16 wherein the heat of combustion of said waste supplies substantially all the heat necessary to operate the process after initial heating.

19. The method according to claim 16 wherein at least a portion of said alkali is carbonate contained in said sludge and substantially all of said trivalent chromium is oxidized in the furnace and recovered.

* * * * *